United States Patent [19]
Bacon et al.

[11] 3,931,897
[45] Jan. 13, 1976

[54] LOAD-OUT CONVEYOR APPARATUS

[76] Inventors: Duane D. Bacon, 6099 Brigadoon Drive, Longmont, Colo. 80501; Edward J. Rutt, 2609 50th Ave., Greeley, Colo. 80631

[22] Filed: Aug. 19, 1974

[21] Appl. No.: 498,417

[52] U.S. Cl. ............ 214/6 G; 198/89; 198/96; 198/139; 214/41
[51] Int. Cl.² ............ B65G 57/112
[58] Field of Search ........ B65G/67/08; 214/6 G, 41; 198/2, 3, 4, 5, 88, 89, 93, 96, 117, 126, 139, 233

[56] References Cited
UNITED STATES PATENTS

| | | |
|---|---|---|
| 1,570,484 | 1/1926 | Hanson ............... 198/3 |
| 1,959,735 | 5/1934 | Phillips ............... 198/89 X |
| 2,150,211 | 3/1939 | Edwards ............... 198/3 |
| 2,793,731 | 5/1957 | Manierre ............... 198/2 |
| 2,990,938 | 7/1961 | Sheehan ............... 198/90 |
| 3,006,454 | 10/1961 | Penn ............... 198/89 |
| 3,294,214 | 12/1966 | Tweten ............... 198/89 |
| 3,581,874 | 6/1971 | Keith ............... 198/233 X |
| 3,651,963 | 3/1972 | McWilliams ............... 214/6 G |
| 3,717,263 | 2/1973 | McWilliams ............... 214/6 G |

*Primary Examiner*—Robert J. Spar
*Assistant Examiner*—Leslie J. Paperner
*Attorney, Agent, or Firm*—Ancel W. Lewis, Jr.

[57] ABSTRACT

In loading apparatus for conveying the articles from inside a warehouse or the like and stacking them in a transport car parked at a loading dock or the like in a continuous operation. The loading apparatus includes a main frame positioned a distance inside a warehouse doorway, an arrangement of upper and lower conveyors that move in and are guided by the frame to extend toward and back away from the transport car a selected distance and a discharge conveyor pivotally mounted on a wheeled vehicle. The discharge conveyor is movable from side to side and up and down and the wheeled vehicle moves toward and away from the frame to extend and retract the upper and lower conveyors and to position the discharge end of the discharge conveyor in the transport box in such a way as to stack the articles while they are being delivered in a continuous stream via said upper, lower and discharge conveyors.

14 Claims, 10 Drawing Figures

Fig_6

Fig_7

Fig_8

Fig_9

Fig_10

LOAD-OUT CONVEYOR APPARATUS

FIELD

This invention relates generally to loading apparatus and more particularly to novel apparatus suitable for efficiently conveying and loading relatively large numbers of individual articles from one area to another and particularly from storage into wheeled transport cars or the like.

BACKGROUND OF THE INVENTION

Present material handling operations require loading machinery that will deliver to a designated area a variety of articles of different sizes, shapes, weights and compositions quickly, efficiently and with a minimum of labor. A particular applications for which the present invention is highly suited is the loading of boxes containing cuts of meat from refrigerated storage and stacking them in a transport car at the loading dock. Prior known practices for this application used commercial conveyors and lift trucks and pallets, which necessitated considerable manual lifting, carrying and stacking.

In providing loading apparatus at a loading dock, the space requirements, ease of manipulation and comparative cost with lift trucks, pallets and manual handling are prime factors to be considered. The present invention has been found particularly effective for loading boxes containing cuts of meat from refrigerated storage into a transport box but it is understood that the present invention is applicable to moving a large variety of different types of articles in different loading situations.

Accordingly, it is an object of this invention to provide a novel loading apparatus for articles, such as boxed cuts of meat, characterized by its simplicity, durability and ease of operation affording a minimum of manual handling and a loading thereof that is much more rapid than if done by hand.

Another object of this invention is to provide a novel loading apparatus that will convey a plurality of articles over a relatively long distance and a distance that varies as the loading takes place and typically extends from a point substantially inside a loading dock of a warehouse all the way into the back of a transport car parked adjacent the loading dock.

Yet a further object of this invention is to provide a novel loading apparatus for articles having a highly versatile, self-propelled discharge conveyor section that will travel on a wheeled vehicle along the loading dock, through the doorway and into a transport car box and be readily shifted upward, down and from side to side and reverse its position in the car to deposit the articles being dilivered in a steady stream to all parts of the receiving area whereby the articles may be stacked in a continuous sequence.

Still another object of this invention is to provide a novel loading apparatus that is readily shifted and positioned while conveying the articles and is movable between an extended and retracted position wherein conveyor sections are stacked one on another in a retracted position to take up a minimum, out of the way space when not in use.

Yet another object of this invention is to provide a novel loading apparatus having independent, manually operable means at the discharge end for controlling the entire sequence of loading operations from either side thereof.

Still another object of this invention is to provide a novel loading apparatus having a power driven discharge conveyor section pivotally mounted on a wheeled vehicle for free movement at its intake end to swing from side to side in a horizontal plane and power driven to swing in a vertical plane to stack the articles in the receiving area while the articles are being delivered in a continuous stream.

Yet a further object of this invention is to provide a highly efficient loading apparatus characterized by the provision of a self-propelled vehicle carrying a discharge conveyor and moving trailing power driven transfer conveyors whereby the trailing conveyors are moved toward and retracted away from the discharge area by the movement of the vehicle and whereby the vehicle is driven into the receiving area and the discharge end of the discharge conveyor moved to the desired point laterally and vertically to stack each successive article in a continuous stacking operation.

Other objects, advantages and capabilities of the present invention will become more apparent as the description proceeds taken in conjunction with the accompanying drawings, in which:

FIG. 2 is a top plan view of the loading apparatus of FIG. 1 in a retracted position;

FIG. 3 is a side elevation view of the apparatus as shown in FIG. 2;

Referring now particularly to FIGS. 1 through 5, in general, in the loading apparatus shown, there is provided a support frame 11 herein described as located in a warehouse represented at 12 arranged in line with an inwardly of a warehouse doorway 13 at the loading dock where a transport car represented at 14 such as a railway box car or truck transport is located to be loaded with articles being delivered to the apparatus. An upper conveyor 16 and a lower conveyor 17 are mounted to move relative to the support frame 11 through one end thereof between a retracted position shown in FIGS. 2 through 5 and on extended position shown in FIG. 1. A discharge conveyor 18 is arranged in a receiving relation to the lower conveyor 17 and is supported for rolling straight line movement on a wheeled vehicle 19. The discharge conveyor 18 is pivotally coupled to the vehicle 19 at its forward end and advanced in a straight line movement by the vehicle 19. The vehicle 19 and discharge conveyor 18 are moved into the bed of the transport car 14 over a ramp 20 and discharges units of cargo delivered thereto by the upper and lower conveyors to load from side to side and floor to ceiling. A straight feeding conveyor 21 is arranged above the upper conveyor in a direction at right angles thereto to which articles are delivered from a suitable storage in the warehouse or the like in a steady stream. The feed conveyor can deliver from either side and the articles are furnished thereto by suitable control that is independent from that of the loading apparatus of the present invention.

The main support frame 11 is shown as stationary and is comprised of three, similar, inverted U-shaped frame members generally designated by reference numbers 24, 25 and 26 disposed at spaced intervals relative to one another to define a storage area in which the upper and lower conveyors 16 and 17 are received and stored in a retracted position when not in use or not fully extended. Each frame members has a pair of similar laterally spaced uprights 27 connected at their upper ends by a laterally extending top beam 28, and each of the uprights 27 are shown as having a bottom plate 29 bolted to the supporting surface in the warehouse which typically is a concrete floor. As an alternative, however, it should be appreciated that the support frames 11 could have the uprights supported on wheels that would move laterally relative to the movement of conveyors 16, 17 and 18 whereby the apparatus could be moved laterally in the warehouse to service a plurality of doorways 13 arranged along a loading dock.

A pair of elongated, parallel spaced lower side rails 31 each of a similar construction, each have a U-shaped transverse cross-section. Rails 31 are mounted on and extend along the inside of the opposed uprights of the frame members to provide continuous guide surface for the guiding movement of the lower conveyor in a relative straight course. The side rails 31 have outwardly flared end portions designated 32 at both ends and the ones at the front end just beyond the end frame member 26 serves to guide the lower conveyor back into the support frame in the initial part of the retracting movement thereof in case it is slightly out of line in the return stroke. In turn, there is provided a pair of parallel spaced upper side rails 33, each having a right angle transverse cross-section. The upper side rails 33 are mounted on and extend along the inside of the uprights on the inside of the frame members, each upper side rail having a top horizontal flange providing a horizontal track surface 34 for supporting the upper conveyor for rolling movement in and out of the frame. The lower side rails and upper side rails inter-connect with the frame members to complete the support frame and make it a rigid, integral skeletal-like assembly.

Figures 1, 4, 5:
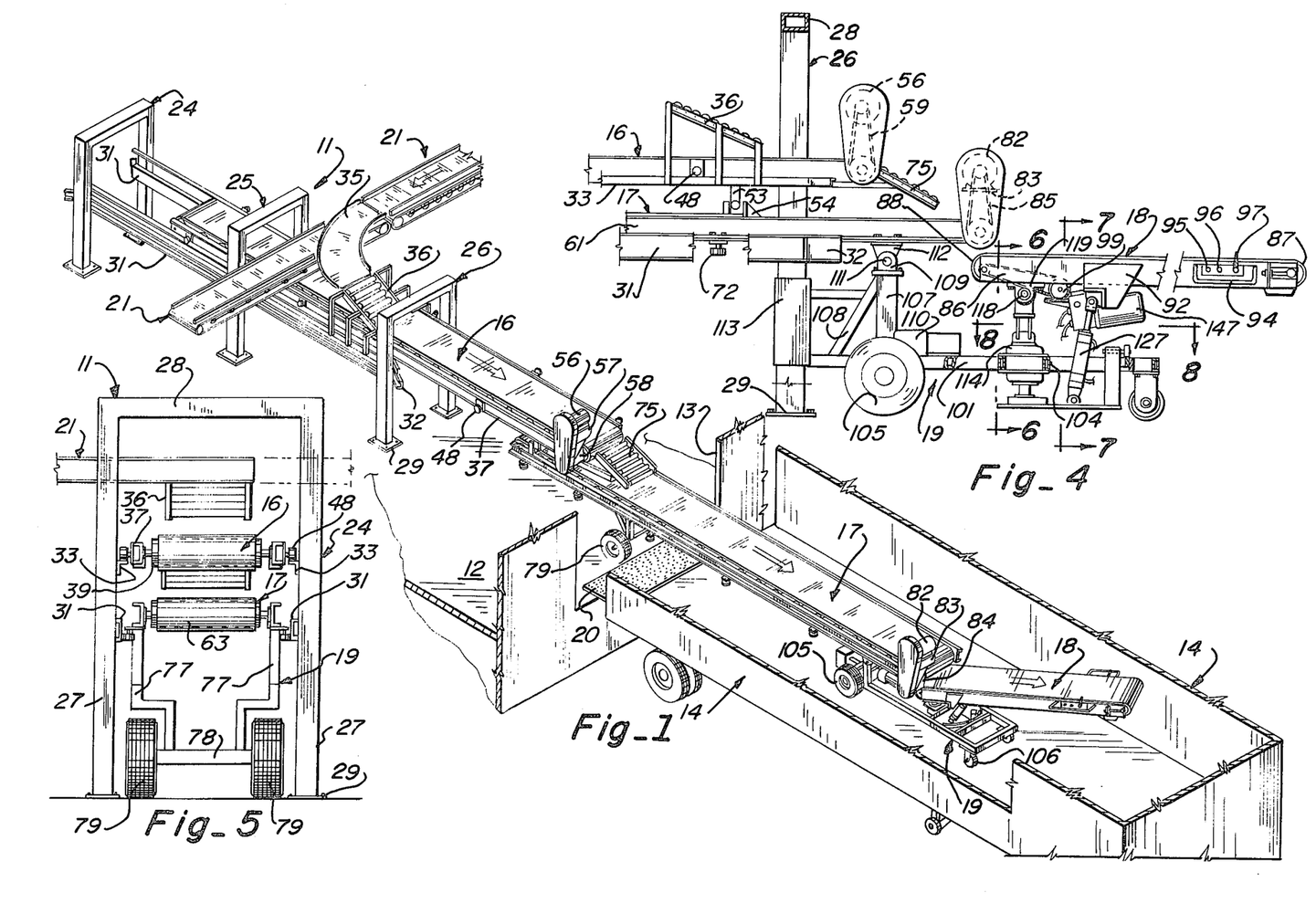
FIG. 1 is a perspective view showing the loading apparatus extended into a position in a transport car.
FIG. 4 is an enlarged side elevation view showing the forward portion of the apparatus in the retracted position.
FIG. 5 is a rear elevation view of the apparatus of FIGS. 2 through 4.
Figure 6:
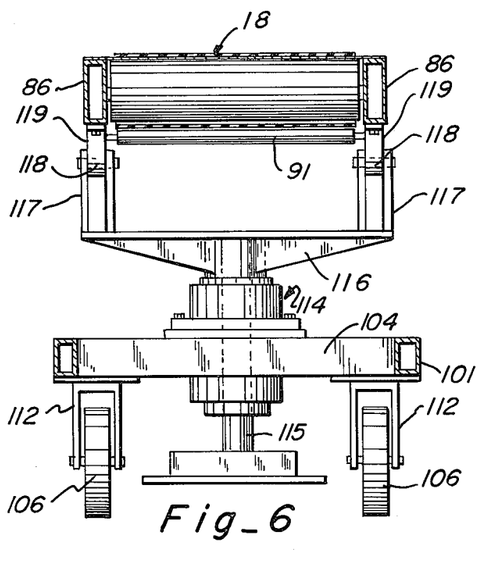
FIG. 6 is a sectional view taken along lines 6—6 of FIG. 4.
Figure 7:
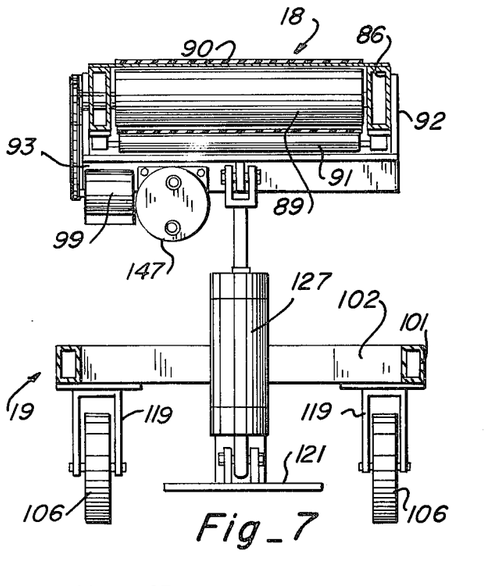
FIG. 7 is a sectional view taken along lines 7—7 of FIG. 4.
Figure 8:
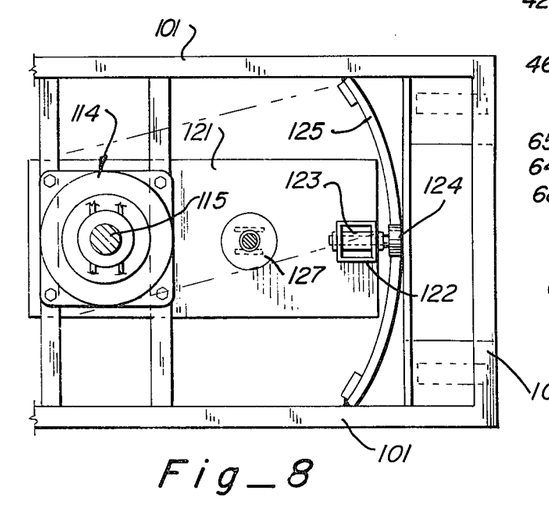
FIG. 8 is a sectional view taken along lines 8—8 of FIG. 4.

As best seen in FIGS. 1 and 2 for transporting articles to the conveyors of the loading apparatus, there is shown the straight feeding conveyor section 21 arranged transversely to the orientation of the loading apparatus which may be powered or of the gravity-type and may feed the upper section 16 from either side. A curved transfer section 35 which is comprised of a series of axially spaced rollers passes the incoming articles from a transverse direction of flow to the same direction as that of the upper and lower conveyors and an inclined transfer section 36 succeeding section 35 drops the cargo onto the top of the rear end of the upper conveyor 16. Inclined transfer section 36 is shown as supported by the frame of the upper conveyor 16.

Figure 9:
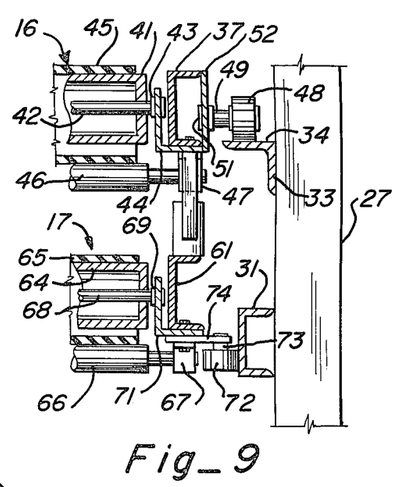
FIG. 9 is a sectional view taken along lines 9—9 of FIG. 3.

As best seen in FIG. 2, the upper conveyor 16 is of the endless belt type and includes a frame comprised of a pair of parallel spaced side channels 37 held by suitable cross braces affixed thereto on which there is mounted a forward end roller 38 with a shaft journaled at its ends in bearings in the side channels and a rear end roller 39 with a shaft journaled at its ends in bearings in the side channels 37. A series of axially spaced idler rollers 41 are mounted at spaced intervals along the conveyor frame between the side channels and end rollers and specifically each idler roller has a shaft 42 journaled at ends in a bearing 43 in an individual angle member 44 bolted to the bottom leg of the side channel as best seen in FIG. 9. An endless belt 45 is trained over the end rollers 38 and 39 and supported by the idler rollers 41. A belt retainer roller 46 is mounted on a side bracket 47 at the underside of the channel to prevent the belt 45 from sagging.

To provide for free rolling movement of the upper conveyor 18 relative to the main support frame 11 there is provided at spaced intervals along each of the side channels 37 a horizontal side roller 48 movable on surface 34, the roller 48 being mounted on a horizontal stub shaft 49 journaled in a bearing 51 on a plate 52 affixed to the side of the conveyor frame.

An arm 53 depends from each of the side channels 37 adjacent the front end to be engaged by a forward upstanding member 54 on the lower conveyor during the retraction movement of the lower conveyor described hereinafter and a rear upstanding member 55 on each side of the conveyor during the extension movement of the lower conveyor so that the upper conveyor 16 moves as a slave in response to the movement of the lower conveyor 17 between a retracted position (FIG. 3) and and extended position (FIG. 1).

The drive for the belt of the upper conveyor 16 includes an electric motor 56 mounted on a base 57 above the belt 45 at the discharge end of the upper conveyor and the output shaft of the motor is coupled to a speed reduction gear box 58 via sprockets and a V-belt 59. The gear box 58 drives the forward end roller 38 which in turn drives the belt 45.

The lower conveyor 17 is similar in construction to the upper conveyor 16 above described and includes a conveyor frame with a pair of parallel spaced side channels 61, a forward end roller 62, a rear end roller 63, idler rollers 64 and an endless belt 65. A belt retainer roller 66 is mounted on a side bracket 67 at the underside of the side channel 61 to prevent the belt from sagging. Each idler roller 64 as shown in FIG. 9 has a shaft 68 journaled at the ends in a bearing 69 in an individual angle member 71 to the underside of the side channel. To guide the lower conveyor in the main support frame there is provided at spaced intervals along each of the frame a vertical side roller 72 mounted on a stub shaft 73 supported by a plate 74 bolted below the underside angle member 71 of side channel 61. An inclined transfer conveyor 75 depends from the upper conveyor and moves cargo from the upper conveyor 16 to the lower conveyor 17.

The lower conveyor 17 is supported in an elevated position above the ground surface at the rear end thereof by means of a modified U-frame as viewed from the rear (FIG. 5) having a pair of opposed, parallel spaced upright side arms 77 that are affixed at their lower ends to a cross member 78 and are upwardly and outwardly stopped to extend over a pair of rear ground-engaging wheels 79 and affixed at their upper ends to the bottom on associated side channels of the lower conveyor frame. An angular brace 81 extends from an intermediate part of each side arm to the underside of the side channel for added strength. The rear wheels 79 are mounted on an axle contained in the cross-member 78. The lower belt conveyor is supported for wheeled movement at the forward end on the vehicle 19 as described fully hereinafter.

The drive for the belt of the lower conveyor includes an electric motor 82 mounted on a base 83 above the belt 65 at the discharge end thereof and the output shaft of the motor is coupled to a gear box 84 via sprockets and a V-belt 85 with the gear box driving to the forward end roller 62 which in turn drives the belt 65.

The discharge conveyor 18 is comprised of a frame with a pair of parallel spaced, tubular, side beams 86 held by suitable cross braces on which there is mounted a forward end roller 87 and a rear end roller 88 together with intermediate idler rollers 89 suitably mounted on shafts supported by the side beams. An endless belt 90 is trained over the rollers. Again, a belt holder roller 91 is mounted under the belt 90 at spaced intervals along the discharge conveyor. A U-shaped support frame with upright side arms 92 and a transverse cross-arm 93 is affixed to the conveyor frame between its midpoint and the pivotal mount therefore for its support on the vehicle as fully described hereinafter.

For the control of the apparatus there are identical operator stations on each side of the discharge conveyor 18 at the discharge end designated A and B. Each station has a U-shaped handle 94 that extends laterally outwardly and downwardly and is affixed to the opposite sides of the side beam at the discharge end to facilitate the manual swinging of the discharge conveyor from side to side by the operator. There is further provided at each station electric operator control in the form of a stop button 95, start button 96 and swivel rod 97. The drive for the discharge conveyor is in the form of an electric gear motor 99 mounted on support frame arm 93 and coupled to the rear end roller 81 via sprockets and a chain.

The wheeled vehicle 19 has a box like frame inclusive of a pair of spaced parallel side members 101, a front end member 102 and rear end member 103 interconnected at the ends thereof, as well as a pair of parallel spaced transverse intermediate cross-members 104 and is mounted for movement on a set of rear wheels 105 and a set of front wheels 106.

To secure the front end of the lower conveyor 17 at a position above the frame of the vehicle 19 on a pivotal mounting there provided a pair of parallel spaced upright members 107 upstanding from the parallel spaced side members 101 and each upright member is reinforced by a downwardly inclined brace 108. The upright members 107 are located in line with the axle for the rear wheels 105 and each carries a plate and a bearing 109 through which a cross-shaft 111 extends. The cross-shaft 111 extends through a pair of parallel spaced depending lugs 112 on associated side frame members of the lower conveyor. This pivotal connection between the vehicle and lower conveyor allows for adjustments in elevation between the warehouse dock and the transport car for when the vehicle 19 is driven over the connecting ramp 20. Each of the front wheels 106 are shown mounted on an inverted U-shaped yoke 119 affixed to the associated side member of the vehicle frame for movement thereon on a straight line course. A box 113 for the electric control is mounted on the frame at the rear of the vehicle.

A swivel assembly for the discharge conveyor 18 generally designated by numeral 114 is mounted at an intermediate or central position on the vehicle frame between the spaced intermediate cross members 104. The swivel assembly 114 has a vertical shaft 115 carried in four belt flange bearing rollers. A yoke comprised of a lower cross bar 116 and a pair of upright side arms 117 is mounted on the upper end of the shaft 115. Each upright side arm 117 is comprised of two parallel spaced plates affixed at their lower ends to the top of the cross bar 116 at one end in turn support pivot shaft 118 passing through a lug 119 affixed to and depending from each frame side beams 86 of the discharge conveyor whereby to establish a raised support on the vehicle frame and a horizontal axis of rotation for the rear of the discharge conveyor in such a way that the discharge end will reach the plane of the support surface or ground represented by dashed lines 18b to an elevated position substantially above a horizontal position represented by dashed lines 18a.

The lower end of the shaft 115 below the frame of the swivel assembly supports an inner platform 121 so that it will swing from side to side conjointly with the discharge conveyor, 18 and further support the discharge conveyor. The platform 121 has upright member 122 mounted at its forward end at a central position and carries a shaft 123 and a roller 124. The roller 124 moves on an arcuate track 125 affixed at its ends to the side members 101 of the vehicle frame whereby to provide further support for the discharge conveyor on the vehicle in its swivel or side to side movement.

For the power driven movement of the discharge conveyor up and down in a vertical plane, there is provided a bi-directional hydraulic cylinder 127 attached at its lower end to the inside platform 121 and at its upper end to the cross plate 93 on the underside of the discharge conveyor frame. The specific attachment shown at each end is a pin and lug arrangement whereby the extension of the rod in the cylinder raises the discharge end of the discharge conveyor to a position 18a and a retraction of the rod in the cylinder lowers the discharge end to the ground plane as to position 18b.

Figure 10:
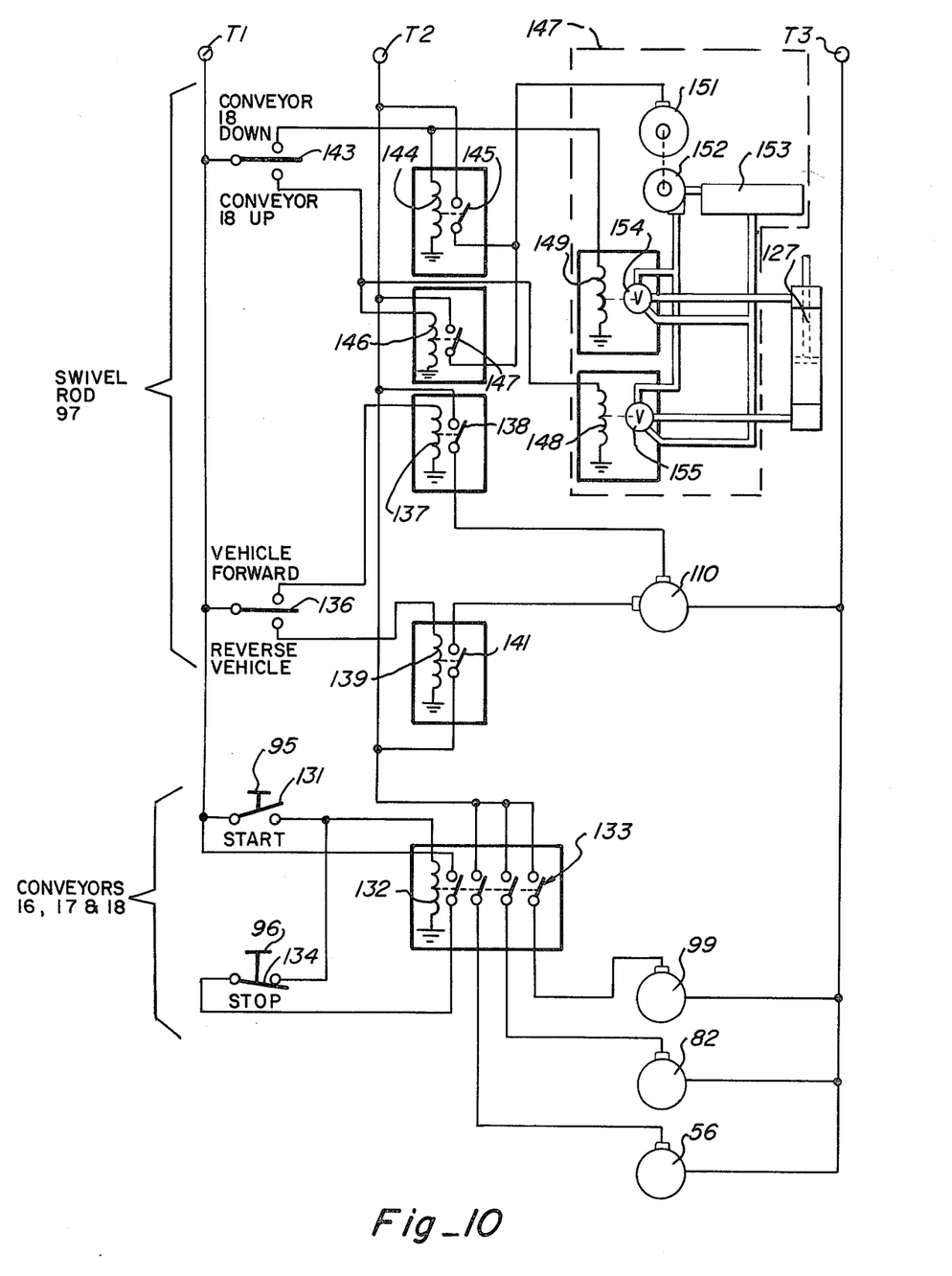
FIG. 10 is a schematic circuit diagram showing the electric and hydraulic control for the loading apparatus of FIGS. 1 through 9.

Reference is now made to the schematic circuit diagram shown in FIG. 10 to explain the circuit and the selective actuation of various electric switches to control electric power to operate the drive motors 56, 82, 99, 110 and cylinder 127 above described. The electric power input terminals to which a source of electric power is applied are designated T1, T2 and T3. The vehicle motor 110, upper conveyor motor 56, lower conveyor motor 82 and discharge conveyor motor 56 are shown as each having one terminal connected to common terminal T3 which is a grounded or return terminal.

Again all of the operator control for the manual operation of the loading apparatus is located at the discharge end of the discharge conveyor and is in the form of identical control stations designated A and B on each side thereof. Each operator control includes a start button 95 and a stop button 96 to regulate the conveyor motors 58, 84 and 134 as well as a swivel rod 97 that moves from a neutral position to a forward position, rear position, up position and down position to regulate the actuation of the hydraulic cylinder 121 and vehicle drive motor 110.

In the electric circuit start button 95 is associated with a normally open electric switch having one side connected to power terminal T1 and the other side to a coil 132 of a holding relay that in turn has four ganged electric switches 133 each connected between power terminal T2 and one of each of the drive motors 56, 82 and 99. A normally closed electric switch 134 associated with the stop button 96 is connected through one of the ganged switches to terminal T1 to bypass switch 131 and hold the coil 132 energized so that a depression of the start button 95 and closure of its switch 132 energized the relay coil and connects via the contacts the power from the terminal T2 to each of the conveyor motors, with power being retained by the stop button switch 131. Then a depression of the stop button and opening of the stop button switch deenergized the relay coil 132 and opens ganged switch 133 to stop the conveyor motors 56, 82 and 99.

In the electric circuit shown for controlling the vehicle motor 110 there is provided a two position electric switch 136 operable by movement of the swivel rod 97. Switch 136 has one side connected to power terminal T1 and one post of the other side connected to the coil 137 of a relay having a switch 138 that connects the electric power from terminal T2 to a forward terminal on the motor 110 and the other side post connected to coil 139 in a relay having a switch 141 connected the power of terminal T2 to the other reverse terminal on the vehicle motor 110 so that an energization of first relay effects the forward movement and an energization of the second relay effects a rearward movement of the vehicle motor 110.

The circuit diagram shown has a two position switch 143 for regulating the hydraulic cylinder 127 that is operatively associated with the up and down movement of the swivel rod 97. The switch 143 has one side connected to power terminal T1 and one post of the other side connected to a coil 144 of a relay having a switch 145 as well as to a coil 149 in a solenoid operated valve 154 in a hydraulic unit 147. Switch 143 has the other post connected to a coil 146 of a relay having a switch 140 as well as to a coil 148 in a solenoid operated valve 155 in the hydraulic unit 147.

In the hydraulic unit 147, a valve 154 controls the fluid flow to one side of the hydraulic cylinder 127 causing it to retract to lower the discharge conveyor and valve 155 controls the fluid flow to the other side of the cylinder 127 causing it to extend to raise the discharge conveyor. The fluid to the valves 154 and 155 is provided by an electric motor connected to terminal T2 via switches 140 or 145, the motor driving a pump 152 that pumps fluid to the valves 154 and 155. A reservoir 153 receives the return flow from the valves and delivers it to the pump in a manner that is conventional in the hydraulic control art.

In a full sequence of operation then, the articles being loaded are sent along the feeding conveyor 21, but the controls for the feeding conveyor 21 are independent of and remote from the discharge conveyor 18. For the purposes of explaining the operation then it will be assumed that a stream of articles are being conveyed along the feed conveyor 21 and are side-tracked by conveyor 35. The swivel rod 97 is moved to a forward position and the vehicle 18 moves in a straight line away from the frame 11 through the dock doorway 13 over the platform 20, over the transport car platform and to the back thereof. As the lower conveyor is drawn away from the frame by the vehicle its rear upright member 55 engages depending member 53 and the upper conveyor rolls out from the end of the frame 11 as best seen in FIG. 1. Once the vehicle has positioned the discharge conveyor 19 at the back of the transport box the swivel rod 97 is moved to the neutral position and the vehicle stops.

Either of the start buttons 95 are depressed actuating the upper, lower and discharge conveyors whereupon the articles are delivered in a stream onto the upper conveyor, lower conveyor and discharge conveyor in that order.

The discharge end of the discharge conveyor 17 is lowered or raised by moving either swivel rod down causing the hydraulic cylinder 127 to retract therein to lower the discharge end of the discharge conveyor while at the same time the operator swings the discharge end of the discharge conveyor to one side or the other so that the first article is discharged on the transport car in the corner.

The discharge end is then manually swung laterally by the operator so that the next article is deposited beside the first and this repeats until a whole row is deposited across the transport car whereupon the swivel rod is moved up and the hydraulic cylinder raises the discharge end of the discharge conveyor a short distance and then it is manually swung back to start a row of articles on top of the first row. This sequence repeats until there is a full stack at the back of the box whereupon the swivel rod is moved to the rear position and the vehicle backs up to position the discharge conveyor for the next succeeding stack.

This procedure of stacking and retracting is repeated until the transport box is filled whereupon the movement of the swivel rod to a rear position causes the lower conveyor member 54 to engage the upper conveyor member 53 and the upper conveyors are rolled back into the fully retracted position with the vehicle parked adjacent the end thereof as best seen in FIGS. 2, 3 and 4.

Although the present invention has been described with a certain degree of particularly, it is understood that the present disclosure has been made by way of example and that changes in details of structure may be made without departing from the spirit thereof.

What is claimed is:

1. In loading apparatus for stacking a plurality of articles from a storage area to a receiving area, the combination comprising:

a reference frame adapted to be positioned between the storage area and a selected distance from the receiving area;

conveyor means for moving articles delivered thereto over a selected distance, said conveyor means including a transfer section movable in and out of and guided by the frame and a discharge section in receiving relation to the transfer section and pivotally mounted at its intake end to swing up and down about a horizontal axis and to swing from side to side about a vertical axis to discharge articles at a selected point in the receiving area, said transfer section including an upper conveyor supported for guided movement on said frame and a lower conveyor supported for guided movement by said frame and for movement under the upper conveyor in a stacked relation in a retracted position in the frame and an end-to-end relation in an extended position projecting beyond the end of the frame; and a self-propelled vehicle including a rigid, unitary box-shaped vehicle frame movable on wheel means, said vehicle being movable relative to said reference frame, said vehicle being coupled to the transfer section and supporting the pivoted intake end of said discharge section and supporting said discharge section for moving said transfer section relative to said reference frame and positioning said discharge section in the receiving area, said vehicle having control means operable at the discharge end of said discharge section to regulate the direction, starting and stopping of said vehicle.

2. In loading apparatus as set forth in claim 1 wherein said lower conveyor is pivotally connected to said vehicle at the discharge end of the lower conveyor to be moved thereby.

3. In loading apparatus as set forth in claim 1 wherein said vehicle is arranged to move in a straight line in line with the longitudinal axis of said frame.

4. In loading apparatus as set forth in claim 1 wherein said control means is in the form of independent manually operable control on each side of the discharge end of the discharge conveyor.

5. In loading apparatus for stacking a plurality of articles in a receiving area remote from a point of delivery of a plurality of the articles, the combination comprising:
- a reference frame positioned between the point of delivery and a selected distance from the receiving area;
- an upper power-driven conveyor supported for guided movement in and out through said frame and adapted to receive articles from the point of delivery;
- a lower article-moving power-driven conveyor supported for guided movement in and out through said frame arranged in receiving relation to said upper conveyor, the upper and lower conveyors being retractable to a position inside the frame and extensible to span a selected distance beyond one end of the frame;
- a discharge conveyor in receiving relation to said lower conveyor, said discharge conveyor being mounted to swing up and down about a horizontal axis and to swing from side to side about a vertical axis to discharge articles at a selected point in the receiving area;
- a wheeled vehicle having a rigid, unitary, box-shaped frame and front and rear wheels and motive power source on the box-shaped frame to propel the vehicle, the discharge end of the lower conveyor being pivotally coupled to the vehicle so that movement of the vehicle moves the upper and lower conveyors in and out of the reference frame between the extended and retracted positions, said vehicle supporting the intake end of said discharge conveyor, said vehicle having a power actuator to swing the discharge conveyor up and down about a horizontal axis adjacent the intake end thereof; and
- control means operable at the discharge end of the discharge conveyor to regulate the direction and the stopping, starting and direction of said vehicle to regulate the position of the discharge conveyor in relation to the receiving area for stacking articles in the receiving area and to regulate the elevation of the discharge end of said discharge conveyor.

6. In loading apparatus as set forth in claim 5 wherein said frame has a plurality of inverted U-shaped frame members arranged at longitudinally spaced intervals, each frame member having a pair of laterally spaced uprights and a laterally extending top beam, a pair of parallel spaced upper side rails secured to the inside of the uprights providing horizontal track surfaces and a pair of parallel spaced lower side rails secured to the inside of the uprights providing vertical guide surfaces.

7. In loading apparatus as set forth in claim 6 wherein said upper conveyor has an endless belt trained over a pair of end rollers and intermediate idler rollers and having guide rollers on opposite sides at spaced intervals along its length rollable on said horizontal track surfaces for guided movement through one end of the frame and a drive motor for moving the endless belt.

8. In loading apparatus as set forth in claim 6 wherein said lower conveyor has an endless belt trained over a pair of end rollers and intermediate idler rollers, said lower conveyor being mounted on wheels at its intake end and having guide rollers on opposite sides at spaced intervals along its length in rolling engagement with said lower side rail guide surfaces for guided movement through one end of the frame and a drive motor for moving the endless belt.

9. In loading apparatus as set forth in claim 5 wherein said upper and lower conveyors have co-operative projecting members at the ends thereof that cause the upper conveyor to follow the lower conveyor as a slave by the lower conveyor in the extended and retracted movement of the lower conveyor.

10. In loading apparatus as set forth in claim 5 wherein said discharge conveyor has an endless belt trained over a pair of end rollers and intermediate idler rollers and a drive motor for moving the endless belt.

11. In loading apparatus as set forth in claim 5 wherein said vehicle has a box-type frame and a pair of front and rear wheels, a drive motor coupled to the rear wheels, said vehicle having an upright frame at the rear end with a cross-shaft providing a pivotal connection with said lower conveyor, said vehicle having a vertical shaft supported in bearings supported on cross members between the front and rear wheels and connected to the discharge conveyor to support it for swinging movement from side to side, said shaft carrying a platform at its lower end having a roller movable on a track supported on the frame to further support the discharge conveyor on the vehicle frame.

12. In loading apparatus as set forth in claim 11 including a bi-directional hydraulic cylinder mounted on the platform and connected to the discharge conveyor forwardly of its pivotal mounting to raise and lower the discharge conveyor between a raised position above the horizontal and a lowered position wherein the discharge end of the discharge conveyor is in the plane of the ground supporting surface and said control means includes independent manually operable electric control including a stop button, start button and swivel rod and grip handles on each side of the discharge conveyor at its discharge end to regulate the direction, starting and stopping of the vehicle motor via the swivel rod, the hydraulic cylinder via the swivel rod to regulate the position of the vehicle discharge conveyor in relation to the receiving area and to regulate the starting and stopping of the drive motors on the upper, lower and discharge conveyors via the start and stop buttons.

13. In loading apparatus as set forth in claim 5 including a bi-directional hydraulic cylinder mounted on the vehicle forwardly of the pivotal mounting for moving said discharge conveyor up and down, a hydraulic unit for supplying fluid to said cylinder and electric control associated with said hydraulic unit to selectively control said hydraulic unit to control the movement thereof in either direction.

14. In loading apparatus for stacking a plurality of articles in a transport car and the like from a point of delivery in a warehouse and the like, the combination comprising:

a frame positioned a selected distance from the transport car having a plurality of inverted U-shaped frame members arranged at longitudinally spaced intervals, each frame member having a pair of laterally spaced uprights and a laterally extending top beam, a pair of parallel spaced upper side rails secured to inside of the uprights providing horizontal track surfaces and a pair of parallel spaced lower side rails secured to the inside of the uprights providing vertical guide surfaces;

An upper conveyor having an endless belt trained over a pair of end rollers and intermediate idler rollers, said upper conveyor having guide rollers on opposite sides at spaced intervals along the length rollable on siad horizontal track surfaces for guided movement through one end of the frame;

a drive motor on the upper conveyor for moving the endless belt;

a lower conveyor having an endless belt trained over a pair of end rollers and intermediate idler rollers, said lower conveyor being mounted on wheels at its intake end and having guide rollers on opposite sides at spaced intervals along its length in rolling engagement with said lower side rail guide surfaces for guided movement through one end of the frame, said upper and lower conveyors having co-operative projecting members at the ends thereof that cause the upper conveyor to follow the lower conveyor as a slave in response to the movement of the lower conveyor in the extended and retracted movement thereof;

a drive motor on the lower conveyor for moving the associated endless belt;

a discharge conveyor having an endless belt trained over a pair of end rollers and intermediate idler rollers, said discharge conveyor being in receiving relation to the lower conveyor and pivotally mounted at its intake end to swing up and down about a horizontal axis and from side to side about a vertical axis;

a drive motor on the discharge conveyor for moving the associated endless belt;

a vehicle having a box-type frame and a pair of front and rear wheels, a drive motor coupled to the rear wheels, said vehicle having an upright frame at the rear end with a cross-shaft providing a pivotal connection with said lower conveyor, said vehicle having a vertical shaft supported in bearings supported on cross-members between the front and rear wheels and connected to the discharge conveyor to support it for swinging movement from side to side, said shaft carrying a platform at its lower end having a roller movable on a track supported on the frame to further support the discharge conveyor on the vehicle frame;

a bi-directional hydraulic cylinder mounted on the platform and connected to the discharge conveyor forwardly of its pivotal mounting to raise and lower the discharge conveyor between a raised position above the horizontal and a lowered position wherein the discharge end of the discharge conveyor is in the plane of the ground supporting surface; and independent manually operable control including a stop button, start button and swivel rod and grip handles on each side of the discharge conveyor at its discharge end to regulate the direction, statring and stopping of the vehicle motor via the swivel rod, the hydraulic cylinder via the swivel rod to regulate the position of the vehicle discharge conveyor in relation to the receiving area and to regulate the starting and stopping of the drive motors on the upper, lower and discharge conveyors via the start and stop buttons.

* * * * *